No. 660,873. Patented Oct. 30, 1900.
S. H. VAN TRUMP & F. D. ROWELL.
VEHICLE WHEEL.
(Application filed Nov. 20, 1899.)
(No Model.)
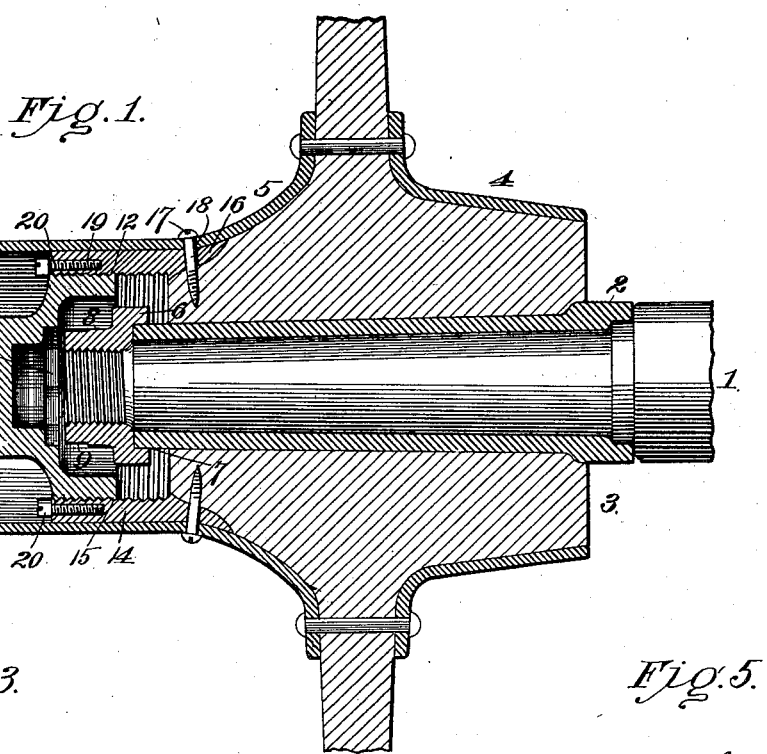
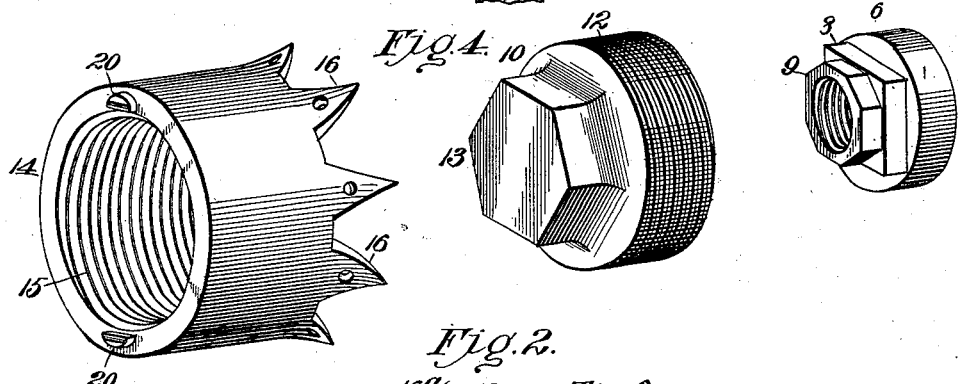
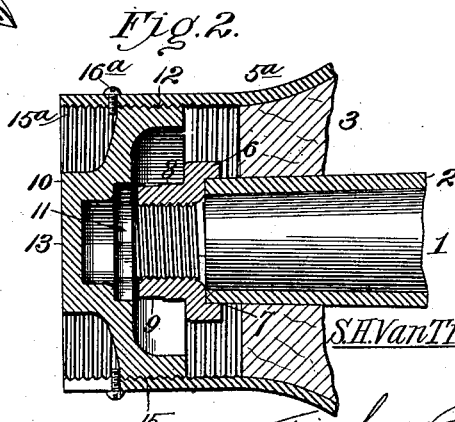
Witnesses:
Inventors:
S. H. Van Trump - F. D. Rowell.
By Fischer & Thorpe, attys.

UNITED STATES PATENT OFFICE.

SAMUEL H. VAN TRUMP, OF LAWSON, AND FRANK D. ROWELL, OF LIBERTY, MISSOURI.

VEHICLE-WHEEL.

SPECIFICATION forming part of Letters Patent No. 660,873, dated October 30, 1900.

Application filed November 20, 1899. Serial No. 737,578. (No model.)

*To all whom it may concern:*

Be it known that we, SAMUEL H. VAN TRUMP, of Lawson, Ray county, and FRANK D. ROWELL, of Liberty, Clay county, Missouri, have invented a new and useful Vehicle-Wheel, of which the following is a specification.

Our invention relates to vehicle-wheels, and more especially to improvements in that class wherein the axle is protected from the admission of dust into the outer end of the hub and the grease is confined to its proper sphere and wherein the revolution of the wheel either secures the axle-nut in or removes it from operative position, our object in this connection being to provide a construction which increases the strength and improves the appearance of the hub and by which the operation of securing the wheel in or removing it from position without handling the axle-nut is facilitated; furthermore, to provide a construction which can be applied to any vehicle-wheel having or which may be provided with a point-band.

With these objects in view the invention consists in certain novel and peculiar features of construction and combinations of parts, as will be hereinafter described and claimed, and in order that it may be fully understood reference is to be had to the accompanying drawings, in which—

Figure 1 represents a section of the central portion of a wheel-hub, the same being operatively secured upon an axle in accordance with our invention. Fig. 2 represents a similar section of a slightly-modified form of construction. Fig. 3 is a perspective view of the supplemental point-band forming a part of our invention. Fig. 4 is a perspective view of the external nut of our invention. Fig. 5 is a perspective view of the internal or axle nut forming part of our invention.

Referring to the drawings in detail, 1 designates the axle; 2, the skein, journaled thereon; 3, the wheel-hub, secured upon the skein; 4, the inner point-band, encircling the hub, and 5 the outer point-band, encircling the hub and secured to the same and to the inner point-band 4 in the usual or any preferred manner.

The axle-nut 6 embodying our invention is formed with a socket 7 to receive the end of the skein, with the rectangular head 8 for convenient engagement by an ordinary wrench, if desired, and with an octagonal head 9, the latter being adapted to fit snugly in the correspondingly-formed or octagonal socket 11 of the external or point-band nut 10, said nut being of cylindrical form and externally threaded, as shown at 12. The external nut is provided with an outwardly-projecting hexagonal head 13 for engagement by a wrench or equivalent device, as hereinafter explained, and in this connection it may be stated that any other style of angular head which can be engaged by a wrench may be provided in lieu of the heads 8, 9, and 13 or any other construction by which said nuts may be rendered relatively immovable or by which the external nut may be caused to move inward or outward in the manner hereinafter described as the wheel revolves upon its axle.

Referring first to the construction whereby this improvement may be applied to complete wheels provided with the usual point-bands, 14 designates a cylindrical sleeve or supplemental point-band of diameter to fit snugly within the outer point-band of the wheel and having its inner surface threaded, as at 15, for engagement with the threads of the external nut above described. The inner end of said band terminates in a plurality of flat perforated points 16, tapering outward at their inner sides in such manner that when said band is fitted within the point-band 5 and driven into the outer end of the hub said points bend outward under the resistance of the hub to their beveled inner sides and follow the curvature or inclination of the point-band 5, as shown clearly in Fig. 1, the band being secured reliably in place by means of a series of screws or rivets 17, which are driven through holes 18, provided in point-band 5, and the registering perforations of said beveled points 16 into the wood of the hub, as shown clearly in Fig. 1. At one or more points the supplemental point-band is provided with a threaded hole 19, engaged by a locking-screw 20, the head of said screw being approximately semicircular in form in order that when its flat side is disposed toward the axis of the band it will not obstruct the removal of the external nut from the hub. When, however, the screw is turned until the flat side of its head extends approximately radially of the band, and therefore projects beyond the inner margin of the same, as shown in Fig. 1, it is obvious that the outward movement of the external nut with relation to said band is limited.

Referring now to Fig. 2, which illustrates the application of the invention to a wheel formerly without a point-band or to a wheel constructed in view of the application of this invention, it will be noticed that the supplemental point-band 14 is dispensed with and the point-band proper (numbered 5ª in this instance) provided with internal threads 15ª, corresponding in function to the threads 15 of said supplemental point-band, the external nut in this instance engaging the threads 15ª, the remaining features of the invention being obviously the same as shown in Fig. 1 and previously described, except that the screws 16ª, extending radially through the point-band, are substituted for the locking-screws 20, the difference being not in principle, but only in form or arrangement.

Assuming that the parts are assembled as shown in Fig. 1, it is obvious that the wheel revolves upon the axle without any possibility of accidental dislocation and that the oil and grease are confined within the hub and the admission of dust from the outer end reliably prevented. Assuming that it is desired to remove the wheel from the hub for any purpose, the operator, first raising the vehicle to clear the wheel from the ground in the customary manner, grasps the head 13 of external nut 10 with a wrench or equivalent device to prevent it turning and spins the wheel backward. The effect of this is of course to revolve the rigid point-band and the attached supplemental point-band, if the latter is employed, which having a screw-thread engagement with the external nut causes the latter to move inward without rotation until its angular socket 11 snugly embraces the angular head 9 of the internal or axle nut, this inward movement of the external nut continuing until the base of its angular socket strikes against the outer face of the internal nut. As soon as the nuts are thus interlocked and the wrench removed the continued movement of the wheel in the same direction necessarily revolves both nuts in the same direction, and as a consequence the internal or axle nut is unscrewed and the wheel automatically disengaged from the axle. Assuming that the internal nut still remains interlocked with the external nut, to put the wheel back in place it is fitted on the axle until the threaded end of the latter projects slightly into the internal or axle nut. The wheel is then spun forward and causes the external nut to act as a wrench and screw the internal nut upon the axle until its limit of movement is attained. As this takes place and as the external nut cannot revolve farther in the same direction, due to its interlocked relation with the internal nut, the continued revolution of the wheel in the same direction causes the threaded point-band to impart outward movement to the external nut, said movement continuing until said nuts are totally disengaged, as will be readily understood. If it be desired to remove the external nut, it is only necessary to turn the screw or screws 20 until the flat sides of their heads extend tangentially of the nut. The latter can then be removed by means of a wrench, or by holding it stationary and spinning the wheel forward the same effect is produced, and if it be desired to remove the axle-nut from position without removing the wheel from the axle it can of course be removed by a wrench engaged with the rectangular head 8. In practice the operation of placing the wheel on or removing it from position is very rapid, due to the fact that the threads on the point-band and external nut run about eight or ten to the inch. If the operator by carelessness or otherwise should have left the external nut interlocked with the internal nut after securing the wheel in position, it is obvious that the forward movement of the wheel will utilize the internal nut as a stationary wrench to prevent the external nut from revolving as the revolution of the point-band forces the external nut outward until it is totally disengaged from the internal nut.

In adjusting the external nut inwardly preliminary to removing the wheel it may happen that the socket 11 fails to register exactly with the head 9, thereby causing the external nut to strike against the face of the internal nut without slipping over the same, as it should. If this happens, the wheel stops its backward revolution and it is necessary to rotate it backward or forward a fraction of a circle, and with it the external nut, in order to cause the socket of the latter to register properly with the head 9 of the internal nut, or instead of rotating the wheel the operator by means of a wrench can turn the external nut enough to accomplish the purpose desired. In practice it takes but a moment or two to effect the object desired, and then the operator can hold the external nut from revolving and spin the wheel backward as before and cause said nut to move inward and interlock with the internal nut.

From the above description it will be apparent that we have produced a vehicle-wheel embodying the features of advantage enumerated as desirable in the statement of invention, and it is to be understood that while we have illustrated and described the preferred embodiment of our invention we reserve the right to make all changes properly falling within its spirit and scope.

Having thus described the invention, what we claim as new, and desire to secure by Letters Patent, is—

1. The combination with an axle, a wheel journaled thereon, an axle-nut screwed on the axle and holding the wheel thereon, and an external nut screwed onto the outer end of the hub and provided with an integrally-formed socket at its inner side adapted to interlock with the axle-nut and turn the latter in one direction or the other, substantially as described.

2. The combination of an axle, a wheel journaled thereon, an axle-nut screwed on the axle and holding the wheel thereon, and an external nut screwed to the hub and adapted to interlock with the axle-nut; the outer or closed end of said external nut being solid or non-perforate, all arranged substantially as and for the purpose set forth.

3. The combination of an axle, a wheel journaled thereon, an axle-nut engaging the axle and holding the wheel thereon, a point-band secured to and forming a part of the wheel-hub, a supplemental internally-threaded point-band secured to the first-named point-band, and an external nut screwed into the supplemental point-band and adapted to interlock with said axle-nut, substantially as described.

4. The combination of an axle, a wheel journaled thereon, an axle-nut engaging the axle and holding the wheel thereon, a point-band secured to and forming a part of the wheel-hub, a supplemental internally-threaded point-band secured within the first-named point-band to form a part of the same and the hub, and an external nut screwed into the supplemental point-band and adapted to interlock with said axle-nut, substantially as described.

5. The combination of an axle, a wheel journaled thereon, an axle-nut engaging the axle and holding the wheel thereon, a point-band secured to and forming a part of the wheel-hub, a supplemental internally-threaded point-band within the first-named point-band provided at its inner end with a plurality of perforated points embedded in the wood of the hub and bearing outwardly against the first-named point-band, securing devices extending through said point-band and perforated points into the wood of the hub, and an external nut screwed into the internally-threaded point-band and adapted to interlock with the axle-nut, substantially as described.

6. The combination of an axle, a wheel journaled thereon, an axle-nut engaging the axle and holding the wheel in place, said nut having an angular head, a point-band secured to the hub, a supplemental internally-threaded point-band secured to and forming a part of the wheel-hub, and an external nut screwed into the supplemental point-band and provided with an angular socket at its inner side adapted to interlock with the correspondingly-formed head of the axle-nut, substantially as and for the purpose set forth.

In testimony whereof we affix our signatures in the presence of witnesses.

SAMUEL H. VAN TRUMP.
FRANK D. ROWELL.

Witnesses as to signature of Samuel H. Van Trump:
  R. M. McGee,
  John P. Moss.

Witnesses as to signature of Frank D. Rowell:
  Fred. S. Loos,
  E. D. Moore.